(12) United States Patent  
DeCesaris et al.

(10) Patent No.: US 8,767,370 B2
(45) Date of Patent: Jul. 1, 2014

(54) PROVIDING NOISE PROTECTION IN A SIGNAL TRANSMISSION SYSTEM

(75) Inventors: Michael DeCesaris, Carrboro, NC (US); John A. Henise, IV, Silver Spring, MD (US); Luke D. Remis, Raleigh, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/557,418

(22) Filed: Jul. 25, 2012

(65) Prior Publication Data

US 2014/0029693 A1      Jan. 30, 2014

(51) Int. Cl.
*H02H 1/04* (2006.01)
*H02H 9/00* (2006.01)

(52) U.S. Cl.
CPC .............. *H02H 9/005* (2013.01); *H02H 1/04* (2013.01); *H02H 25/08* (2013.01)
USPC ........................................ 361/119; 375/296

(58) Field of Classification Search
CPC ........... H02H 1/04; H02H 9/005; H04L 25/08
USPC .......................................... 361/119; 375/296
See application file for complete search history.

(56) References Cited

U.S. PATENT DOCUMENTS

| | | | |
|---|---|---|---|
| 5,233,560 A | 8/1993 | Foss et al. | |
| 6,065,079 A | 5/2000 | Dupuy | |
| 6,924,963 B2 | 8/2005 | Young et al. | |
| 7,212,387 B2 | 5/2007 | Duvvury et | |
| 7,495,878 B2 | 2/2009 | Todd | |
| 7,737,747 B2 * | 6/2010 | Kamath | 327/170 |
| 7,843,368 B2 * | 11/2010 | Chen | 341/120 |
| 7,929,263 B1 | 4/2011 | Peachey et al. | |
| 2002/0195882 A1 * | 12/2002 | Marino | 307/125 |
| 2003/0151877 A1 | 8/2003 | Young et al. | |
| 2004/0090730 A1 | 5/2004 | Byrne et al. | |
| 2010/0073837 A1 | 3/2010 | Predtetchenski et al. | |
| 2010/0157491 A1 | 6/2010 | Hong | |
| 2011/0176245 A1 | 7/2011 | Worley et al. | |

FOREIGN PATENT DOCUMENTS

CN         2750541 Y     1/2006
CN       202034777 U    11/2011

OTHER PUBLICATIONS

Wikipedia, "Charge pump—Wikipedia, the free encyclopedia", accessed Jul. 5, 2012, 3 pages, URL: http://en.wikipedia.org/wiki/Charge_pump.

* cited by examiner

*Primary Examiner* — Scott Bauer
(74) *Attorney, Agent, or Firm* — Brandon C. Kennedy; Katherine S. Brown; Biggers Kennedy Lenart Spraggins LLP (57) ABSTRACT

Providing noise protection in a signal transmission system that includes a first component, second component, controller, switch, and pre-charged capacitor, the first and second components coupled by a signal line, the controller coupled to the switch, the switch configured to couple the signal line to the capacitor when activated, where providing noise protection includes: determining, by the controller, that a signal transmitted on the signal line transitioned to a steady state voltage; enabling, by the controller responsive to determining that the signal transitioned to the steady state voltage, noise protection to the signal on the signal line including activating the switch thereby coupling the signal line to the pre-charged capacitor, the pre-charged capacitor providing noise protection to the signal on the signal line; and prior to the signal on the signal line transitioning from the steady state voltage, deactivating the switch, thereby decoupling the signal line from the pre-charged capacitor.

16 Claims, 8 Drawing Sheets

PROVIDING NOISE PROTECTION IN A SIGNAL TRANSMISSION SYSTEM

BACKGROUND OF THE INVENTION

1. Field of the Invention

The field of the invention is data processing, or, more specifically, methods and apparatus for providing noise protection in a signal transmission system.

2. Description of Related Art

In computer systems today, signals are transmitted among components at high speeds and at progressively lower voltage swings. Any noise introduced into such signals therefore may cause major problems to the computer system. One way to solve noise problems today is to include a large capacitor to the signal line. Such capacitors are static, always coupled to the signal line. As such, the capacitance affects the rise and fall times of the signal. When the signal is configured to be a low-voltage signal with logic levels between 0V and 1.05V, for example, any variation on rise time or fall time may be detrimental to signal integrity. What is needed is a way to protect against noise being introduced into a signal without affecting rise and fall times of the signal.

SUMMARY OF THE INVENTION

Methods and apparatus for providing noise protection in a signal transmission system are disclosed in this specification. Such a signal transmission system includes a first component, a second component, a controller, a switch, and a pre-charged capacitor where the first and second components are coupled by a signal line for signal transmission, the controller is coupled to the switch for activating the switch, and the switch is configured to couple the signal line to the pre-charged capacitor when activated. Providing noise protection in such a system includes: determining, by the controller, that a signal transmitted on the signal line transitioned to a steady state voltage; enabling, by the controller responsive to determining that the signal transitioned to the steady state voltage, noise protection to the signal on the signal line including activating the switch thereby coupling the signal line to the pre-charged capacitor, the pre-charged capacitor providing noise protection to the signal on the signal line; and prior to the signal on the signal line transitioning from the steady state voltage, deactivating the switch, thereby decoupling the signal line from the pre-charged capacitor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
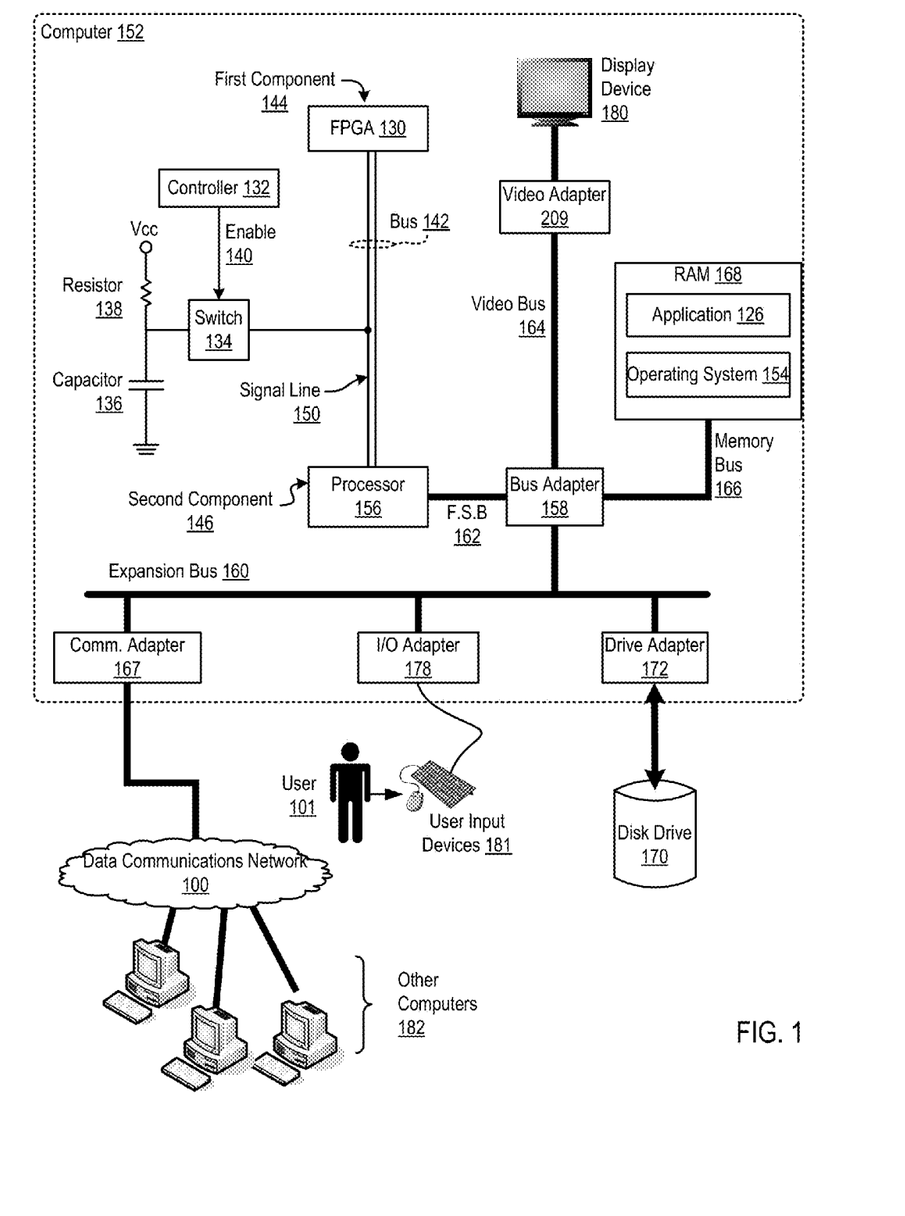
FIG. 1 sets forth a block diagram of a signal transmission system in which noise protection is provided according to embodiments of the present invention.

Exemplary methods and apparatus for providing noise protection in a signal transmission system in accordance with the present invention are described with reference to the accompanying drawings, beginning with FIG. 1. FIG. 1 sets forth a block diagram of a signal transmission system in which noise protection is provided according to embodiments of the present invention. The system of FIG. 1 includes automated computing machinery comprising an exemplary computer (152) useful in providing noise protection in a signal transmission system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (126), a module of computer program instructions that carry out user-level data processing tasks. Examples of such applications (126) include word processing applications, spreadsheet applications, multimedia library management applications, multimedia editing and creation applications, database management applications, and so on as will occur to readers of skill in the art. Also stored in RAM (168) is an operating system (154). Operating systems useful in computers that provide noise protection in a signal transmission system according to embodiments of the present invention include UNIX™, Linux™, Microsoft XP™, AIX™, IBM's i5/OS™, and others as will occur to those of skill in the art. The operating system (154) and application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that provide noise protection in a signal transmission system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computer that provide noise protection in a signal transmission system according to embodiments of the present invention include modems for wired dial-up communications, Ethernet (IEEE 802.3) adapters for wired data communications, and 802.11 adapters for wireless data communications.

As mentioned above, the computer (152) of FIG. 1 is configured to provide noise protection according to embodiments of the present invention. 'Noise' as the term is used in this specification refers to any variation of an electrical signal not intended by the originator of the signal. Examples of such noise may include noise induced by crosstalk from other nearby traces or signal lines, noised induced by electrostatic discharge ('ESD'), noise induced by electromagnetic fields, and others as will occur to readers of skill in the art.

To that end, the computer (152) includes a first component (144) implemented as a field-programmable gate array ('FPGA') (130) and a second component (146) implemented by the processor (156). The system also includes a controller (132), a switch (134), and a pre-charged capacitor (136). The example capacitor (136) is pre-charged through a pull-resistor (138).

In the example of FIG. 1, the first (144) and second (146) components are coupled by a signal line (150) for signal transmission. The signal line (150) in the example of FIG. 1 may be implemented as part of a bus (142), such as an Inter-integrated circuit bus, an System Management bus (SMBus), a 1-wire bus, a Peripheral Component Interface ('PCI') bus, a serial peripheral interface ('SPI') bus, and others as will occur to readers of skill in the art.

The controller (132) in the example system of FIG. 1 is coupled to the switch (134) for activating the switch. The switch (134) is configured to couple the signal line (150) to the pre-charged capacitor (136) when activated.

The controller (132) is configured to provide noise protection in the example system of FIG. 1 by determining that a signal transmitted on the signal line (150) transitioned to a steady state voltage. A steady state voltage may be a logic high (1.05 volts, for example) or a logic low voltage (−1.05 volts, for example).

Responsive to determining that the signal transitioned to the steady state voltage, the controller (132) then enables noise protection to the signal on the signal line (150). The controllers enables noise protection by activating the switch (134) thereby coupling the signal line (150) to the pre-charged capacitor (136). The pre-charged capacitor (136) provides the noise protection to the signal on the signal line. Prior to the signal on the signal line transitioning from the steady state voltage (by returning from a logic high voltage to zero volts or a logic low voltage, for example), the controller deactivates the switch (134) thereby decoupling the signal line (150) from the pre-charged capacitor.

In this way, the controller (132), via the pre-charged capacitor (136), provides noise protection to the signal after the rise time of the signal but prior to the fall time of the signal. That is, the controller (132) provides noise protection to the signal without affecting rise time or fall time of the signal. Further, by pre-charging the capacitor (136), coupling the signal line (150) to the pre-charged capacitor (136) after the signal on the signal has reached a steady-state voltage has minimal (if any) effect on the signal itself.

The arrangement of components, computers, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
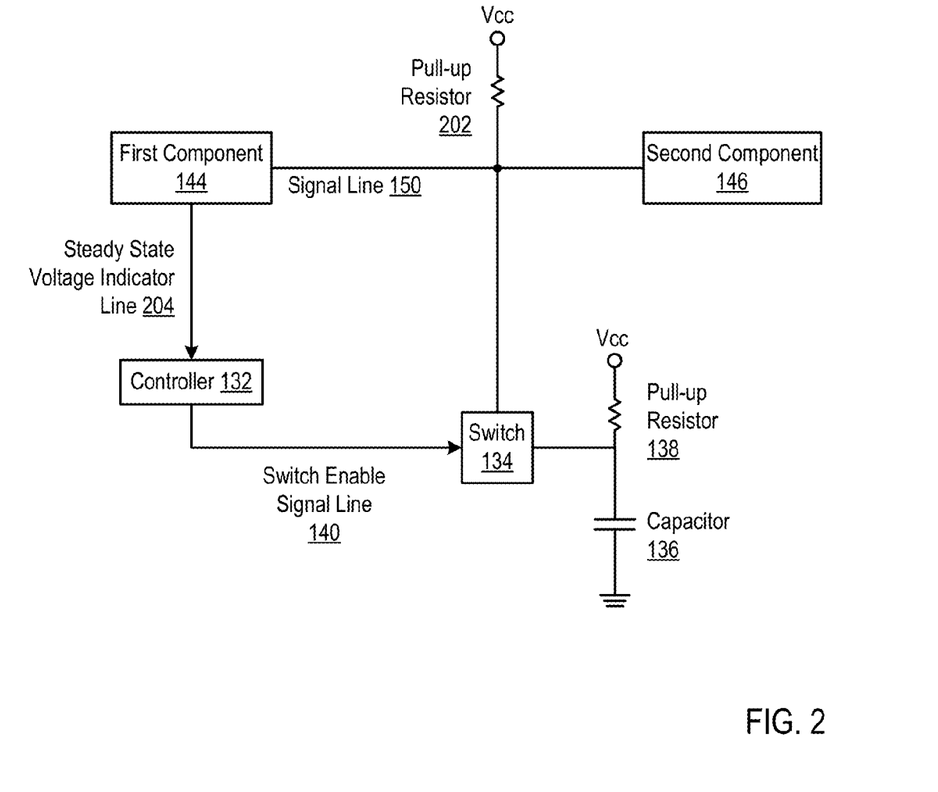
FIG. 2 sets forth a block diagram of an example signal transmission system in which noise protection is provided according to embodiments of the present invention.

For further explanation, FIG. 2 sets forth a block diagram of an example signal transmission system in which noise protection is provided according to embodiments of the present invention. The example system of FIG. 2 includes a first component (144), a second component (146), a controller (132), a switch (134), and a pre-charged capacitor (136). The capacitor (136) is pre-charged through a pull-up resistor (138).

The first (144) and second (146) components are coupled by a signal line (150) for signal transmission. In some embodiments, the signal on the signal line is a high-speed, low-voltage signal. Such a signal on the signal line periodically alternates between a logic low voltage (such as 0V) to a logic high voltage (such as 1.05V) through use of the pull-up resistor (202).

The controller (132) in the example of FIG. 2 is coupled to the switch (134) through a switch enable signal line (140) for activating the switch (134). The switch (134) in the example of FIG. 2 is configured to couple the signal line (150) to the pre-charged capacitor (136) when activated. In some embodiments, the switch (134) may be a bus switch capable of high-speed switching, sometimes known as a "Quick Switch." IDT™ (Integrated Device Technology™), for example, offers a family of 3.3V Bus Switches that provide high-speed switching without adding propagation delay or generating additional ground bounce noise.

The controller (132) operates for providing noise protection to signals on the signal line (150) by determining that a signal transmitted on the signal line (150) transitioned to a steady state voltage. A controller (132) configured for providing noise protection according to embodiments of the present invention may make such a determination in various ways. In the system of FIG. 2, for example, the controller (132) determines that a signal on the signal line 9150) transitioned to a steady state voltage by receiving a notification of the fact from the first component. The notification in the example of FIG. 2 may be received by the controller (132) via the steady state voltage indicator line (204).

Responsive to determining that the signal transitioned to the steady state voltage, the example controller (132) of FIG. 2 enables noise protection to the signal on the signal line (150). The controller (132) in the example of FIG. 2 enables noise protection by activating the switch (134) through the switch enable signal line (140). By activating the switch (134), the switch (134) couples the signal line (150) to the pre-charged capacitor (136) and the pre-charged capacitor (136) provides noise protection to the signal on the signal line (150).

Prior to the signal on the signal line (150) transitioning from the steady state voltage, the controller (132) deactivates the switch (134), thereby decoupling the signal line (150) from the pre-charged capacitor. The controller (132) may be prompted to deactivate the switch in various ways. In the system of FIG. 2, for example, the controller may receive an indication form the first component (144) via the steady state voltage indicator line (204) that the signal on the signal line (150) is about to transition from the steady voltage. In other embodiments, the controller (132) may be configured to deactivate the switch after a predetermined period of time such as, for example, a time less than one full period of a the signal on the signal line (150).

Figure 3:
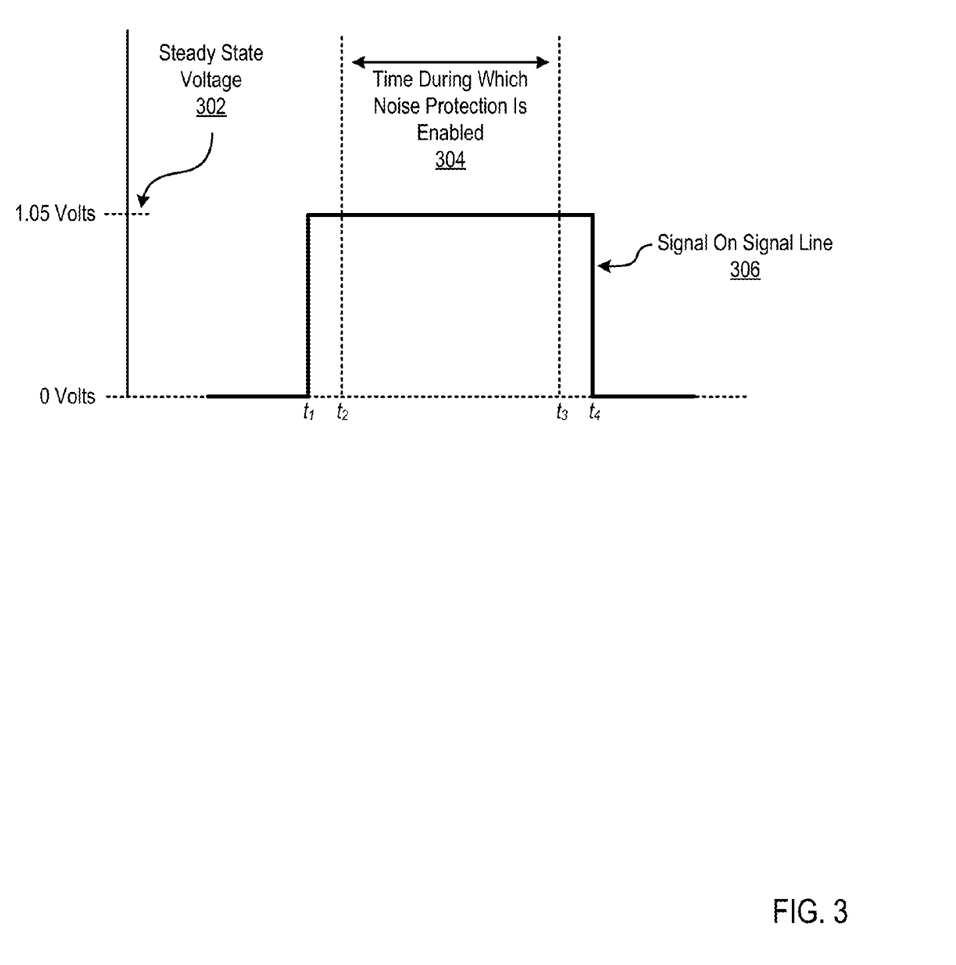
FIG. 3 sets forth an example timing diagram of a signal for which noise protection is provided in accordance with embodiments of the present invention.

For further explanation, FIG. 3 sets forth an example timing diagram of a signal for which noise protection is provided in accordance with embodiments of the present invention. The signal (306) in the example of FIG. 3 is an example of a signal transmitted on a signal line such as the signal line (150) of the example signal transmission system of FIG. 2. For clarity, the timing diagram of FIG. 3 is described here with reference to components of the signal transmission system of FIG. 2. Such a signal transmission system includes a first component (144), a second component (146), a controller (132), a switch (134), and a pre-charged capacitor (136). The first and second components are coupled by a signal line (150) for signal transmission, the controller is coupled to the switch (134) for activating the switch, and the switch (134) is configured to couple the signal line (150) to the pre-charged capacitor (136) when activated.

In the example of FIG. 3, the signal (306) is transmitted from the first component (144) to the second component (146) on the signal line (150). The signal is configured to be pulled from 0V to a steady state voltage (302) of 1.05V by a pull-up resistor (202) coupled to the signal line (150). From time $t_1$ to time $t_2$ in the example timing diagram of FIG. 3, the signal (306) transitions from 0V to the steady state voltage (302).

The controller (132) determines that the signal (306) transitioned to the steady state voltage (302) and enables noise protection to the signal (306) on the signal line (150). The controller (132) enables such noise protection by activating the switch (134) thereby coupling the signal line (150) to the pre-charged capacitor (136) and the pre-charged capacitor provides noise protection to the signal (306) on the signal line (150). In the example timing diagram of FIG. 3, the controller activates the switch at time $t_3$.

Prior to the signal (306) on the signal line (150) transitioning from the steady state voltage (302) to 0 v, the controller (132) deactivates the switch (134), thereby decoupling the signal line (150) from the pre-charged capacitor (136). In the example timing diagram of FIG. 3, the controller (132) deactivates the switch (134) at time $t_3$ and the signal transitions from steady state voltage (302) to the 0V at time $t_4$.

Thus, the controller provides to the signal noise protection after the rise time of the signal (306) in the example of FIG. 3 and before the fall time of the signal (306). The time during which noise protection is enabled (304) in the example of FIG. 3 is from time $t_2$ to time $t_3$.

Figure 4:
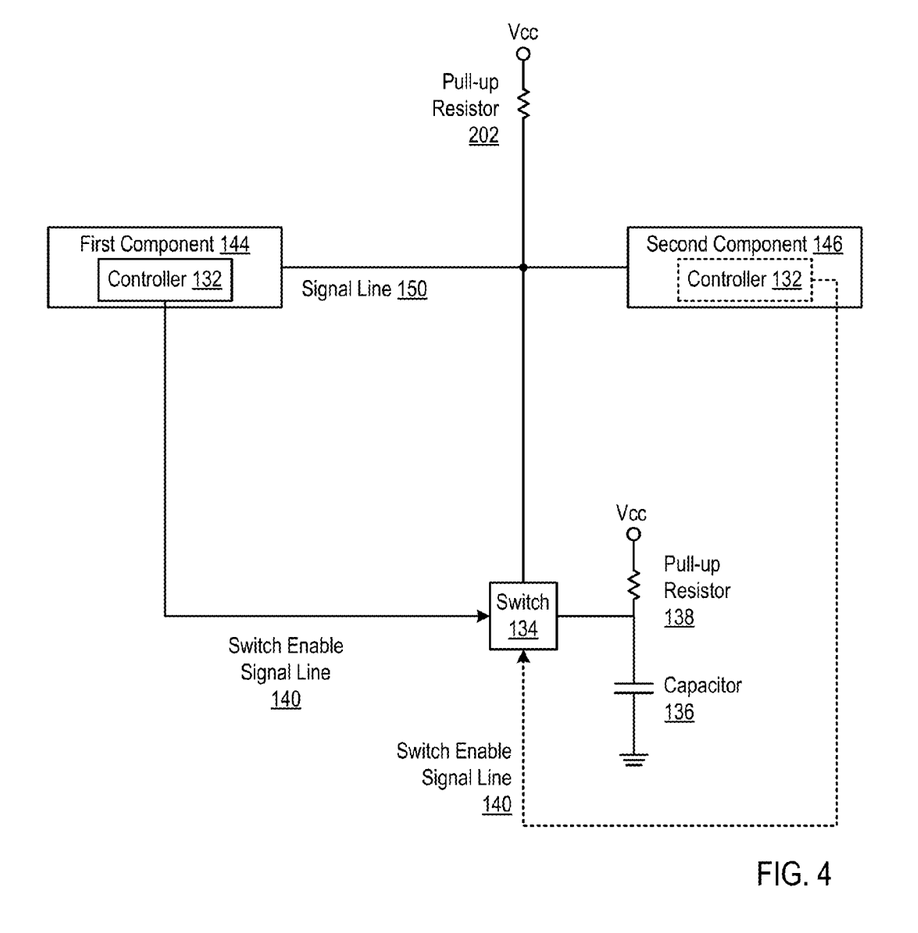
FIG. 4 sets forth a block diagram of another example signal transmission system in which noise protection is provided according to embodiments of the present invention.

For further explanation, FIG. 4 sets forth a block diagram of another example signal transmission system in which noise protection is provided according to embodiments of the present invention. The system of FIG. 4 is similar to the system of FIG. 2 in that the system of FIG. 4 also includes a first component (144), a second component (146), a controller (132), a switch (134), and a pre-charged capacitor (136), where the first (144) and second (146) components are coupled by a signal line (150) for signal transmission.

The system of FIG. 4 differs from the system of FIG. 2, however, in that in the system of FIG. 4 the controller (132) is implemented as part of the first component (144) or alternatively as part of the second component (146). When implemented as part of the first component, the controller (132) is inherently aware transitions of signals on the signal line transmitted by the first component to the second. As such, the controller need not be separately notified of the transitions of the signal line, activating and deactivating the switch responsive to the notifications. When implemented as a subcomponent of the second component (132), the controller (132) is inherently aware transitions of signals on the signal line transmitted by the second component to the first. Further, in some bus systems, a separate separates signal line indicates when a signal is going to be transmitted. Being implemented as part of the first or second component, the separate signal line provides an indication of when a signal on the signal line will be transmitted to the component of which the controller (132) is a subcomponent. Thus, the controller (132) may determine when the signal transitions to a steady state voltage and from a steady state voltage based on the second signal line that provides an indication of an incoming signal.

Figure 5:
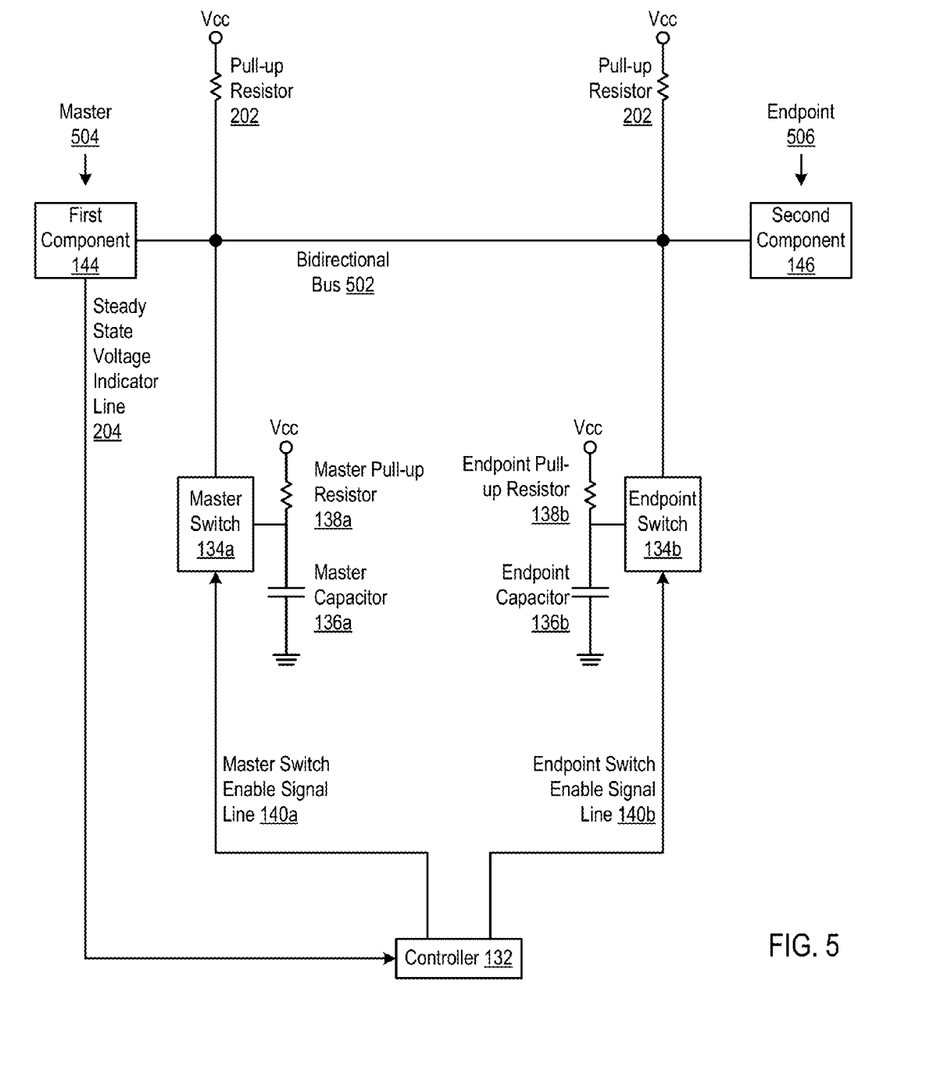
FIG. 5 sets forth a block diagram of another example signal transmission system in which noise protection is provided according to embodiments of the present invention.

For further explanation, FIG. 5 sets forth a block diagram of another example signal transmission system in which noise protection is provided according to embodiments of the present invention. The system of FIG. 5 is similar to the system of FIG. 2 in that the system of FIG. 5 also includes a first component (144), a second component (146), a controller (132), a switch (134), and a pre-charged capacitor (136), where the first (144) and second (146) components are coupled by a signal line (150) for signal transmission.

The system of FIG. 5 differs from the system of FIG. 2, however, in that the first component (144) is implemented as a master (504), the second component is implemented as an endpoint (506) and the signal line is a bidirectional bus (502). The system of FIG. 5 also includes a master switch (134a), a master pre-charged capacitor (136a), an endpoint switch (134b) and an endpoint pre-charged capacitor (134b). The master pre-charged capacitor (136a) is pre-charged by a master pull-up resistor (138a). The endpoint pre-charged capacitor (136b) is pre-charged by an endpoint pull-up resistor (138b). The master switch (134a) is coupled to the bidirectional bus (502) at a physical location closer to the master (504) than the endpoint (506). Likewise, the endpoint switch (134b) is coupled to the bidirectional bus (502) at a physical location closer to the endpoint (506) than the master (504).

The controller (132) is coupled to the master switch (134a), through the master switch enable signal line (140a), for activating the master switch (134a). The master switch (134a) is configured to couple the bidirectional bus (502) to the master pre-charged capacitor (136a) when activated. Likewise, the controller (132) is coupled to the endpoint switch (134b), through the endpoint switch enable signal line (140b), for activating the endpoint switch (134b). The endpoint switch (134b) is configured to couple the bidirectional bus (502) to the endpoint pre-charged capacitor (136a) when activated.

In determining that a signal transmitted on the signal line transitioned to a steady state voltage the controller (132) in the example of FIG. 5 also determines whether the signal transmitted on the bidirectional bus (502) originated at the master (504). That is, the controller determines whether the master sent a signal to the endpoint or vice versa. The controller (132) may determine the origination of the signal on the bus (502) in various ways. In the example of FIG. 5, the master (504) may provide an indication of the origination of the signal as well as the time at which the signal reaches steady state voltage to the controller via the steady state voltage indicator line (204).

The controller (132) enables noise protection to the signal by activating the endpoint switch (134b) if the signal originated at the master (504) and activating the master switch (134a) if the signal did not originate at the master (504). By coupling the pre-charge capacitor at the receiver, power reduction by the introduction of the capacitance on the signal is reduced while protection to the circuit from noise is provided.

Readers of skill in the art will recognize that the controller (132) is shown as a discrete component in the example of FIG. 5 for purposes of explanation, not limitation. Readers will recognize that such a controller may also be implemented as part of the master (504) or the endpoint (506) in a manner similar to that depicted in the example system of FIG. 4.

Figure 6:
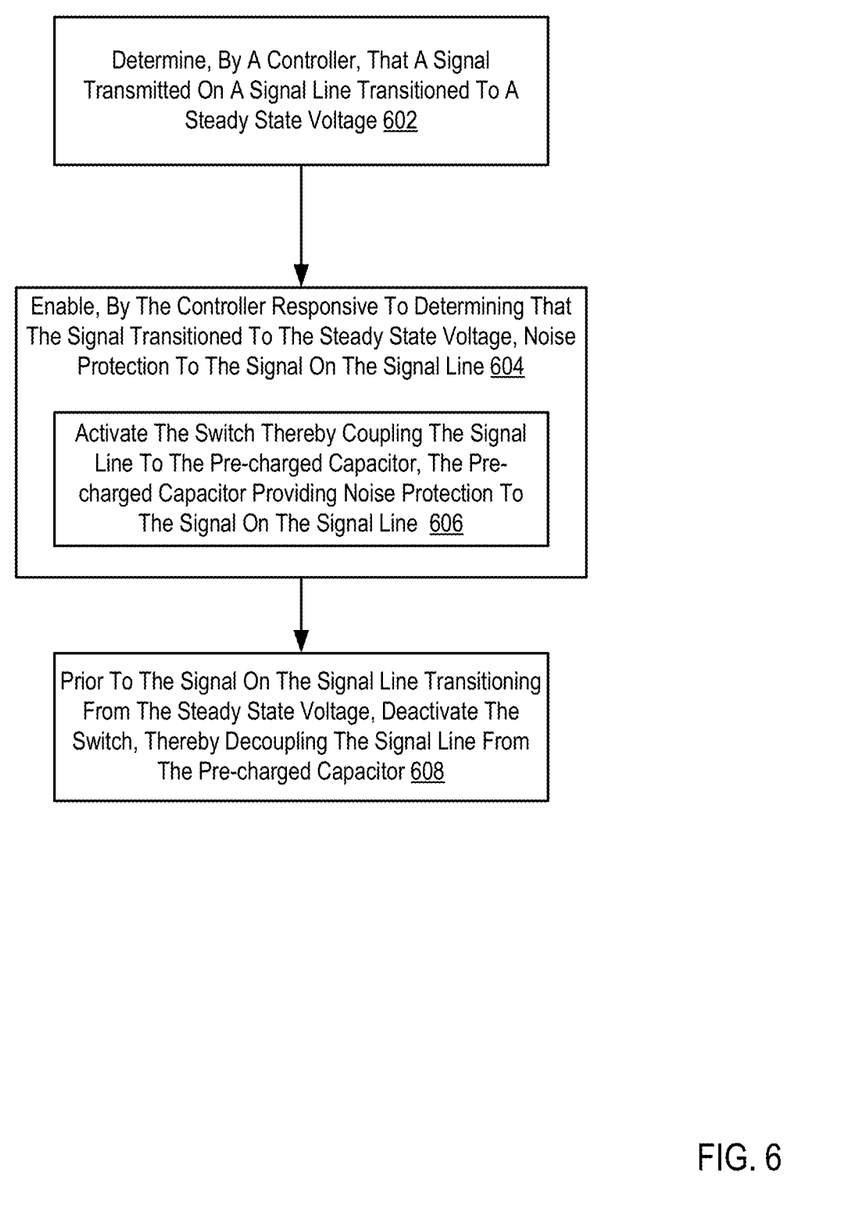
FIG. 6 sets forth a flow chart illustrating an exemplary method for providing noise protection in a signal transmission system according to embodiments of the present invention.

For further explanation, FIG. 6 sets forth a flow chart illustrating an exemplary method for providing noise protection in a signal transmission system according to embodiments of the present invention. An example of such system is depicted in FIG. 2 and includes a first component (144), a second component (146), a controller (132), a switch (134), and a pre-charged capacitor (136). The first (144) and second (146) components are coupled by a signal line (150) for signal transmission. The controller (132) is coupled to the switch (134) for activating the switch (134). The switch (134) is configured to couple the signal line (150) to the pre-charged capacitor (136) when activated.

The method of FIG. 6 includes determining (602), by the controller, that a signal transmitted on the signal line transitioned to a steady state voltage. Determining (602), by the controller, that a signal transmitted on the signal line transitioned to a steady state voltage may be carried out in various ways including, for example, by being notified by the component originating the signal that the signal has reached a steady state voltage.

The method of FIG. 6 also includes enabling (604), by the controller responsive to determining (602) that the signal transitioned to the steady state voltage, noise protection to the signal on the signal line. In the method of FIG. 6, enabling (604) noise protection to the signal on the signal line is carried out by activating (606) the switch thereby coupling the signal line to the pre-charged capacitor. The pre-charged capacitor provides noise protection to the signal on the signal line when coupled to the signal line.

Prior to the signal on the signal line transitioning from the steady state voltage, the method of FIG. 6 includes deactivating (608) the switch, thereby decoupling the signal line from the pre-charged capacitor.

Figure 7:
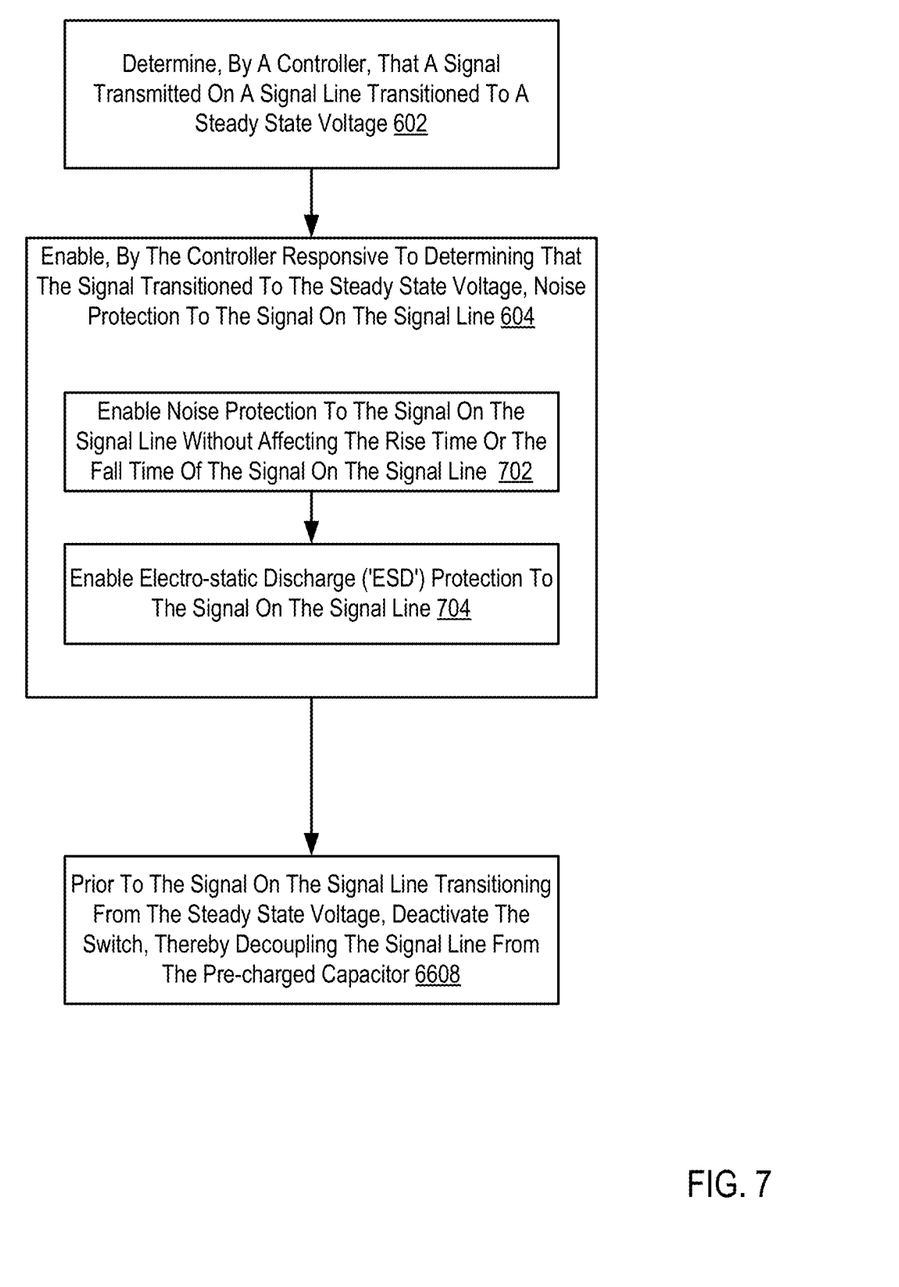
FIG. 7 sets forth a flow chart illustrating a further exemplary method for providing noise protection in a signal transmission system according to embodiments of the present invention.

For further explanation, FIG. 7 sets forth a flow chart illustrating a further exemplary method for providing noise protection in a signal transmission system according to embodiments of the present invention. The method of FIG. 7 is similar to the method of FIG. 6 in that the method of FIG. 7 is carried out in a system similar to the method of FIG. 6 and the method of FIG. 7 includes: determining (602) that a signal transmitted on the signal line transitioned to a steady state voltage; enabling (604) noise protection to the signal on the signal line; and prior to the signal on the signal line transitioning from the steady state voltage, deactivating (608) the switch, thereby decoupling the signal line from the pre-charged capacitor.

The method of FIG. 7 differs from the method of FIG. 6, however, in that enabling (604) noise protection to the signal on the signal line includes enabling (702) noise protection to the signal on the signal line without affecting the rise time or the fall time of the signal on the signal line. By coupling the pre-charged capacitor to the signal line after the signal reaches steady state, the rise or fall time (depending on the whether the signal rises from 0V or falls from 0V in a normal period) is unaffected by the capacitance added to the signal line.

Also in the method of FIG. 7, enabling (604) noise protection to the signal on the signal line includes enabling (704) electro-static discharge ('ESD') protection to the signal on the signal line. The sudden flow of electricity between two objects caused by contact, an electrical short, or dielectric breakdown. The noise protection provided in accordance with example of FIG. 7, protects against ESD.

Figure 8:
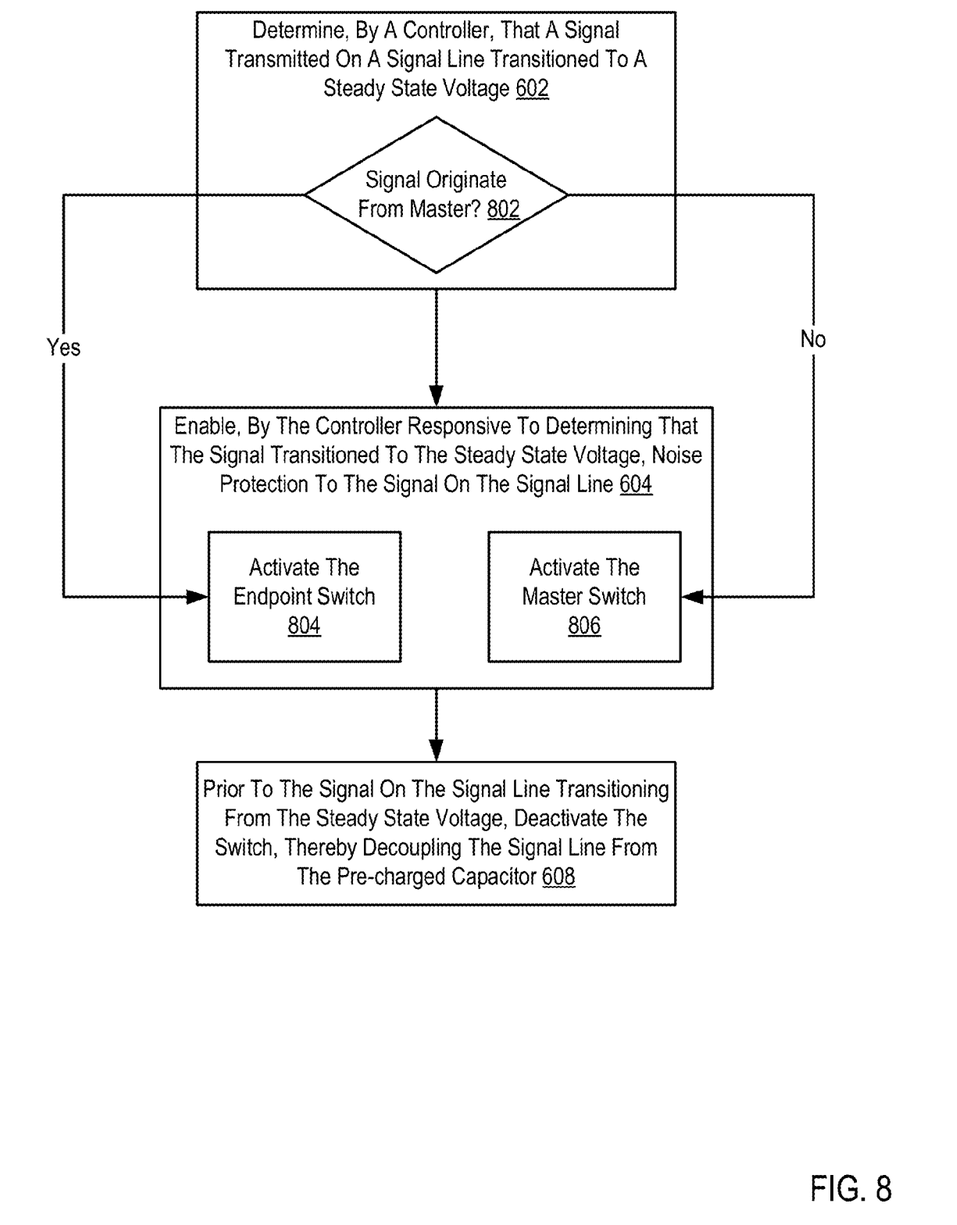
FIG. 8 sets forth a flow chart illustrating a further exemplary method for providing noise protection in a signal transmission system according to embodiments of the present invention.

For further explanation, FIG. 8 sets forth a flow chart illustrating a further exemplary method for providing noise protection in a signal transmission system according to embodiments of the present invention. The method of FIG. 8 is similar to the method of FIG. 6 in that the method of FIG. 8 is carried out in a system similar to the method of FIG. 6 and the method of FIG. 8 includes: determining (602) that a signal transmitted on the signal line transitioned to a steady state voltage; enabling (604) noise protection to the signal on the signal line; and prior to the signal on the signal line transitioning from the steady state voltage, deactivating (608) the switch, thereby decoupling the signal line from the pre-charged capacitor.

The method of FIG. 8 differs from the method of FIG. 6, however, in that the first component is a master, the second component is an endpoint, the signal line is a bidirectional bus, the switch is an endpoint switch, and the pre-charged capacitor comprises is an endpoint pre-charged capacitor, where the endpoint switch is coupled to the bidirectional bus at a physical location closer to the endpoint than the master. The system also includes a master switch and master pre-charged capacitor, where the master switch is coupled to the bidirectional bus at a physical location closer to the master than the endpoint. The controller is also coupled to the master switch for activating the master switch and the master switch is configured to couple the bidirectional bus to the master pre-charged capacitor when activated.

In the method of FIG. 8, determining (602) that a signal transmitted on the signal line transitioned to a steady state voltage also includes determining (802) whether the signal transmitted on the bidirectional bus originated at the master. Determining (802) whether the signal transmitted on the bidirectional bus originated at the master may be carried out in various ways including, for example, by receiving a notification from the master regarding the originator of a signal.

Enabling (604) noise protection to the signal on the signal line in the method of FIG. 8 includes activating (804) the endpoint switch if the signal originated at the master and activating (806) the master switch if the signal did not originate at the master. In this way, the capacitor physically closest to the receiver of the signal is coupled to the signal line so as to reduce power dissipation of the signal during transmission due to the capacitance introduced by the addition of the capacitor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing noise protection in a signal transmission system, the system comprising a first component, a second component, a controller, a switch, and a pre-charged capacitor, the first and second components coupled by a signal line for signal transmission, the controller coupled to the switch for activating the switch, the switch configured to couple the signal line to the pre-charged capacitor when activated, and the method comprising:
  determining, by the controller, that a signal transmitted on the signal line transitioned to a steady state voltage;
  enabling, by the controller responsive to determining that the signal transitioned to the steady state voltage, noise protection to the signal on the signal line including activating the switch thereby coupling the signal line to the pre-charged capacitor, the pre-charged capacitor providing noise protection to the signal on the signal line; and
  prior to the signal on the signal line transitioning from the steady state voltage, deactivating the switch, thereby decoupling the signal line from the pre-charged capacitor.

2. The method of claim 1, wherein:
  the first component comprises a master, the second component comprises an endpoint, the signal line comprises a bidirectional bus, the switch comprises an endpoint switch, and the pre-charged capacitor comprises an endpoint pre-charged capacitor, the endpoint switch coupled to the bidirectional bus at a physical location closer to the endpoint than the master;
  the system further comprises a master switch and master pre-charged capacitor, the master switch coupled to the bidirectional bus at a physical location closer to the master than the endpoint, the controller also coupled to the master switch for activating the master switch, the master switch configured to couple the bidirectional bus to the master pre-charged capacitor when activated;
  determining that a signal transmitted on the signal line transitioned to a steady state voltage further comprises determining whether the signal transmitted on the bidirectional bus originated at the master; and
  enabling noise protection to the signal on the signal line further comprises activating the endpoint switch if the signal originated at the master and activating the master switch if the signal did not originate at the master.

3. The method of claim 1, wherein one of the first component or the second component comprises the controller.

4. The method of claim 1, wherein enabling noise protection to the signal on the signal line further comprises enabling noise protection to the signal on the signal line without affecting the rise time or the fall time of the signal on the signal line.

5. The method of claim 1, wherein enabling noise protection to the signal on the signal line further comprises enabling electro-static discharge ('ESD') protection to the signal on the signal line.

6. The method of claim 1, wherein the signal on the signal line further comprises a high-speed, low-voltage signal.

7. The method of claim 1, wherein the switch comprises a bus switch capable of high-speed switching.

8. A controller for providing noise protection in a signal transmission system, the system comprising a first component, a second component, a switch, and a pre-charged capacitor, the first and second components coupled by a signal line for signal transmission, the controller coupled to the switch for activating the switch, the switch configured to couple the signal line to the pre-charged capacitor when activated, and the control configured to carry out the steps of:
  determining, by the controller, that a signal transmitted on the signal line transitioned to a steady state voltage;
  enabling, by the controller responsive to determining that the signal transitioned to the steady state voltage, noise protection to the signal on the signal line including activating the switch thereby coupling the signal line to the pre-charged capacitor, the pre-charged capacitor providing noise protection to the signal on the signal line; and
  prior to the signal on the signal line transitioning from the steady state voltage, deactivating the switch, thereby decoupling the signal line from the pre-charged capacitor.

9. The controller of claim 8, wherein:
  the first component comprises a master, the second component comprises an endpoint, the signal line comprises a bidirectional bus, the switch comprises an endpoint switch, and the pre-charged capacitor comprises an endpoint pre-charged capacitor, the endpoint switch coupled to the bidirectional bus at a physical location closer to the endpoint than the master;
  the system further comprises a master switch and master pre-charged capacitor, the master switch coupled to the bidirectional bus at a physical location closer to the master than the endpoint, the controller also coupled to the master switch for activating the master switch, the master switch configured to couple the bidirectional bus to the master pre-charged capacitor when activated;
  determining that a signal transmitted on the signal line transitioned to a steady state voltage further comprises determining whether the signal transmitted on the bidirectional bus originated at the master; and
  enabling noise protection to the signal on the signal line further comprises activating the endpoint switch if the signal originated at the master and activating the master switch if the signal did not originate at the master.

10. The controller of claim 8, wherein one of the first component or the second component comprises the controller.

11. The controller of claim 8, enabling noise protection to the signal on the signal line further comprises enabling noise protection to the signal on the signal line without affecting the rise time or the fall time of the signal on the signal line.

12. The controller of claim 8, wherein enabling noise protection to the signal on the signal line further comprises enabling electro-static discharge ('ESD') protection to the signal on the signal line.

13. The controller of claim 8, wherein the switch comprises a bus switch capable of high-speed switching.

14. The controller of claim 8, wherein the controller comprises a processor and computer memory, the computer memory comprising computer program instructions that when executed by the processor causes the controller to provide the noise protection in the signal transmission system.

15. The controller of claim 8, wherein the controller comprises a field-programmable gate array ('FPGA') programmed to provide the noise protection in the signal transmission system.

16. The controller of claim 8, wherein the controller comprises a application-specific integrated circuit ('ASIC') configured to provide the noise protection in the signal transmission system.

* * * * *